June 16, 1936. C. HALL, JR Re. 20,007

ATTACHMENT FOR OPERATING GATE VALVES BY MEANS OF FLUID PRESSURE FROM ANY DESIRED DISTANCE

Original Filed July 22, 1932 6 Sheets-Sheet 1

Inventor:

C. HALL, JR.,

By: Christian R. Nielsen,

Attorney.

June 16, 1936. C. HALL, JR Re. 20,007

ATTACHMENT FOR OPERATING GATE VALVES BY MEANS OF FLUID PRESSURE FROM ANY DESIRED DISTANCE

Original Filed July 22, 1932 6 Sheets-Sheet 2

Inventor:

C. HALL, JR.,

By: Christian R. Nielsen,

Attorney.

June 16, 1936. C. HALL, JR Re. 20,007

ATTACHMENT FOR OPERATING GATE VALVES BY MEANS OF FLUID PRESSURE FROM ANY DESIRED DISTANCE

Original Filed July 22, 1932 6 Sheets-Sheet 3

Inventor:

C. HALL, JR.,

By: Christian R. Nielsen,

Attorney.

June 16, 1936. C. HALL, JR Re. 20,007

ATTACHMENT FOR OPERATING GATE VALVES BY MEANS OF FLUID PRESSURE FROM ANY DESIRED DISTANCE

Original Filed July 22, 1932 6 Sheets-Sheet 4

Inventor:

C. HALL, JR.,

By: Christian R. Nielsen,

Attorney.

June 16, 1936. C. HALL, JR Re. 20,007

ATTACHMENT FOR OPERATING GATE VALVES BY MEANS OF FLUID PRESSURE FROM ANY DESIRED DISTANCE

Original Filed July 22, 1932 6 Sheets-Sheet 5

Inventor:

C. HALL, JR.,

By: Christian R. Nielsen,

Attorney.

June 16, 1936. C. HALL, JR Re. 20,007

ATTACHMENT FOR OPERATING GATE VALVES BY MEANS OF FLUID PRESSURE FROM ANY DESIRED DISTANCE

Original Filed July 22, 1932 6 Sheets-Sheet 6

Inventor:

C. HALL, JR.,

By: Christian R. Nielsen

Attorney

Reissued June 16, 1936

Re. 20,007

UNITED STATES PATENT OFFICE 20,007

ATTACHMENT FOR OPERATING GATE VALVES BY MEANS OF FLUID PRESSURE FROM ANY DESIRED DISTANCE

Carlos Hall, Jr., Mexico, D. F., Mexico, assignor of one-half to Harry Hadfield Hallatt, Mexico, D. F., Mexico Original No. 1,977,554, dated October 16, 1934, Serial No. 624,127, July 22, 1932, and in Mexico June 23, 1932. Application for reissue March 24, 1936, Serial No. 70,706

4 Claims. (Cl. 137—139)

The invention relates to means for opening and closing gate valves by means of pressure of water, air, steam, gas or any other fluid element from any desired distance or by hand, and it consists in the constructions, arrangements and combinations herein described and claimed.

The device according to the present invention is illustrated in the accompanying drawings, in which the same numbers of reference refer to the same parts in all the figures.

The following is a description of the mechanism and operation of the different attachments mentioned in the foregoing.

The mechanism and the operation of the attachment will be described in the following order:

1. Attachment with two cylinders for use on "nonrising stem" valves. Figures 1, 2, 3, 4, 5, and 6.

Figure 9:
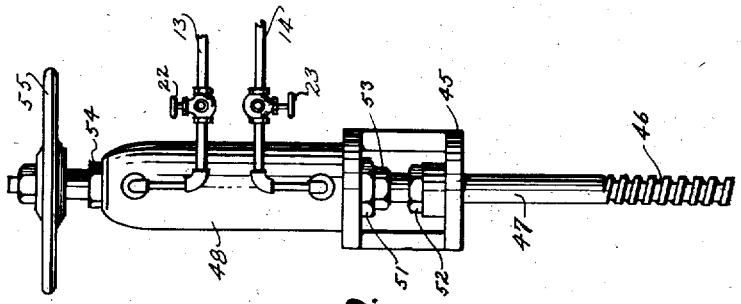
Figure 9 is a total view of an attachment with only one cylinder for a "non-rising stem" valve.
Figure 8:
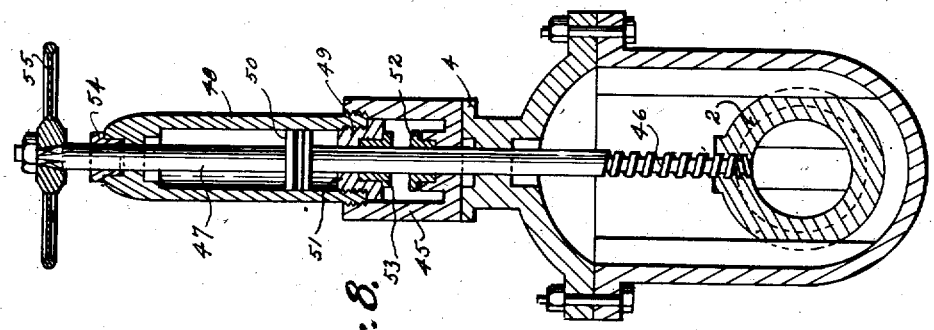
Figure 8 shows a vertical cross section of the same attachment and valve.
Figure 7:
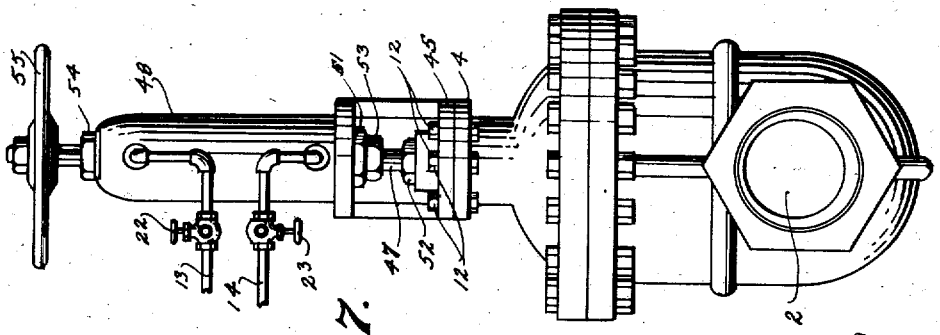
Figure 7 shows an attachment with only one cylinder, which is connected to a "non-rising stem" valve.

2. Attachment with only one cylinder for use on "nonrising stem" valves. Figures 7, 8 and 9.

As is well known, a "nonrising stem" valve consists of the stem 1 which opens and closes the gate 2 of the valve. The stem is provided at about its middle portion with a collar 3 which is held in the valve body by the head of the dome 4 and the stuffing box 5 in such manner that it cannot be raised or lowered but only turned. The opening or closing of the valve by means of the gate 2 is effected by means of the thread 6 on the stem 1 which corresponds to the thread 7 of the gate 2 in such manner that, for instance, when the hand wheel 8 is turned to the right the gate 2 will rise on the thread 6 of the stem 1, or it will descend on the same thread when the wheel is turned to the left. In both operations the stem 1 will not partake in the movement of the gate.

Figure 2:
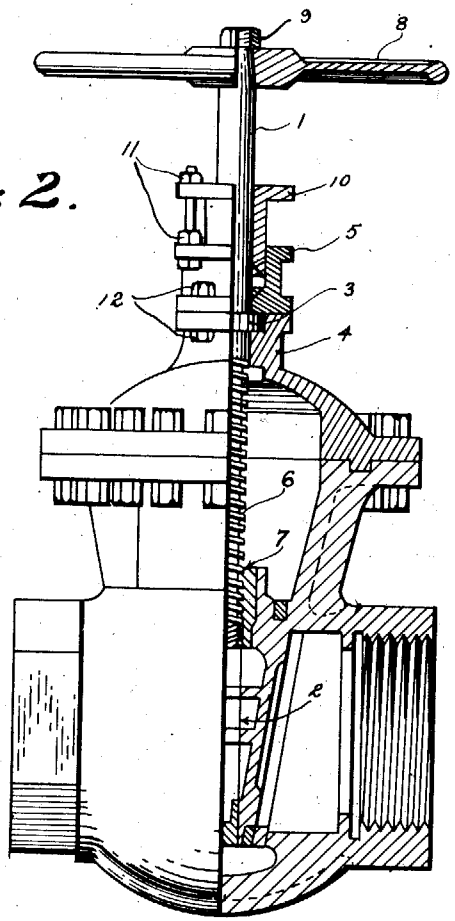
Figure 2 is a vertical semi-sectional view of the same valve seen from the side.
Figure 1:
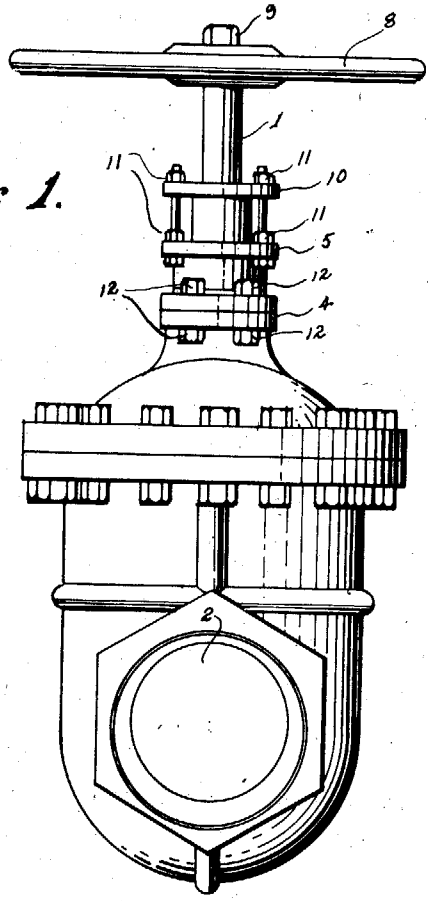
Figure 1 is a front view of an ordinary "nonrising stem" valve.
Figure 6:
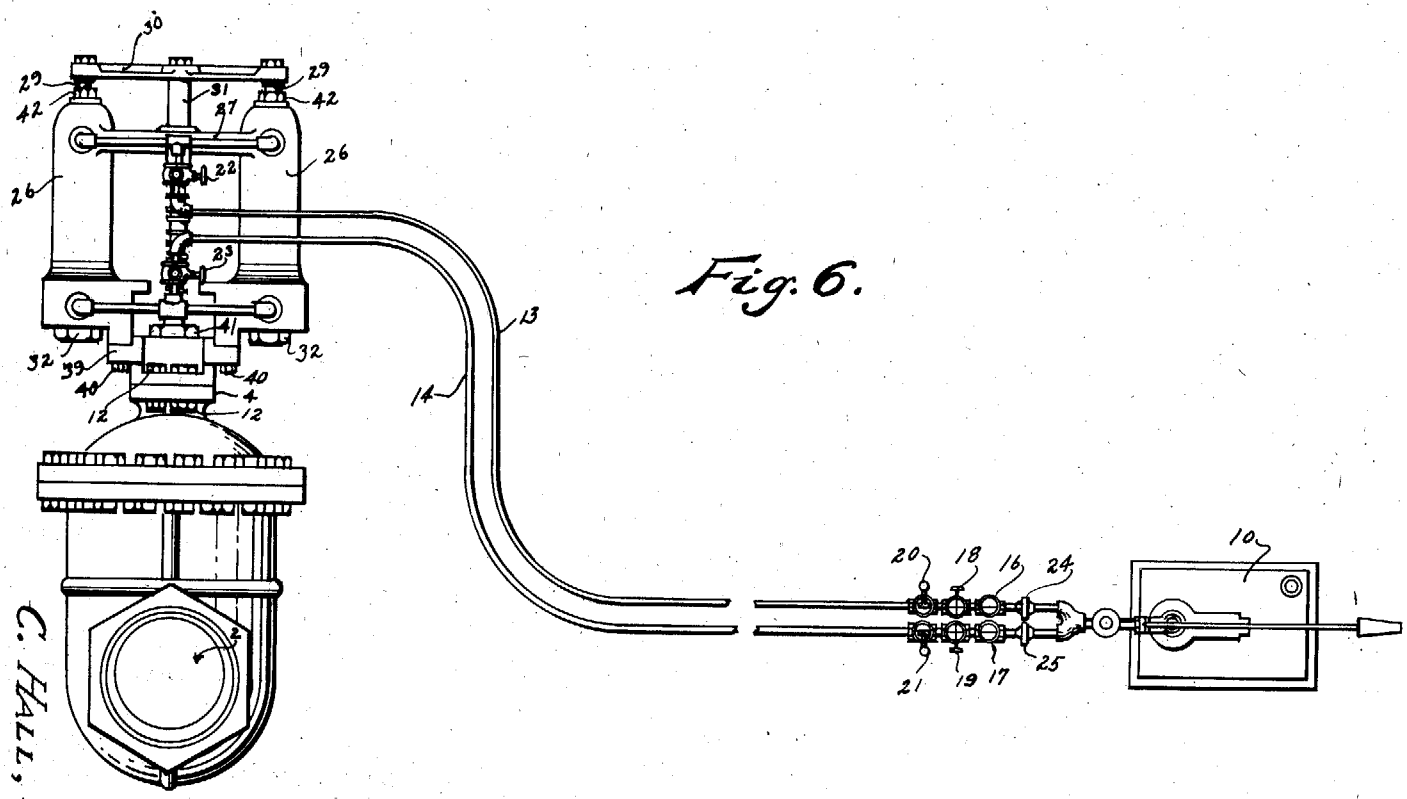
Figure 6 shows the same attachment installed on a "nonrising stem" valve, the pipes conducting fluid pressure and a hydraulic pressure pump which will operate the attachment. The form of using hydraulic pressure is only shown as an example, as any other kind of fluid element may be employed.

The attachment with two cylinders for "nonrising stem" valves is connected to the valve in the following manner:

The nut 9, the hand wheel 8, the stuffing box 10, screws and nuts 11, stuffing box 5, the screws and nuts 12 of the stuffing box and the stem 1 are removed from the valve as shown in Figure 1 whereafter the attachment shown in Figure 6 is placed on the upper part of the valve and secured by means of the screws and nuts 12. Then the pipes 13 and 14, which conduct fluid pressure from a distance for operating the valves, as for instance from a pump 15 or from a deposit of air, gas vapor or any other fluid element in compressed condition, are connected. In order to open the valve from a long distance by means of the attachment, the following has to be done:

The valve 17 is opened and the drain cock 19 is closed, the valve 16 is closed and the drain cock 18 is opened. When this is done, pressure is applied either by means of the pump 15 or by means of the pressure deposit. In this manner there will be injected fluid pressure through the pipe 14 to the lower part of the cylinders beneath the plungers, and consequently these plungers when rising will open the gate 8 of the valve dislodging the fluid element contained in the upper part of the cylinders through the pipe 13 and drain cock 18.

To close the valve by means of the attachment and by fluid pressure, the following has to be done:

Close the valve 17, open the drain cock 19, open the valve 16 and close the drain cock 18.

When hydraulic pressure is used for operating the attachment then the pipes 13 and 14 will first have to be filled with water, and in order to do this, the valves 22 and 23 must first be opened closing at the same time drain cocks 18 and 19, whereafter the valves 16 and 17 are opened and the pump is started to work until sufficient water comes out through the valves 22 and 23.

Each pipe 13 and 14 is provided near the pump 15 with manometers 24 and 25 and safety valves 20 and 21. The manometers have for their object to avoid that more pressure than that required for opening and closing the valve be injected, and the safety valves will allow the escape of any excess of pressure caused for instance by a fire near the attachment and the consequent production of steam by the water contained within the cylinders of the attachment and in the pipes 13 and 14.

The attachment with two cylinders for "nonrising stem" valves is composed of the following: (Figs. 3, 4, 5 and 6).

The main body of the attachment is formed by two twin cylinders 26 which constitute a single body as they are united by a bridge 27. Inside the said cylinders are found the plungers 23 which move the stems 29 which in turn communicate the movement, by means of the bridge 30, to the stem 31 of the attachment and thereby to the gate of the valve.

Figure 4:
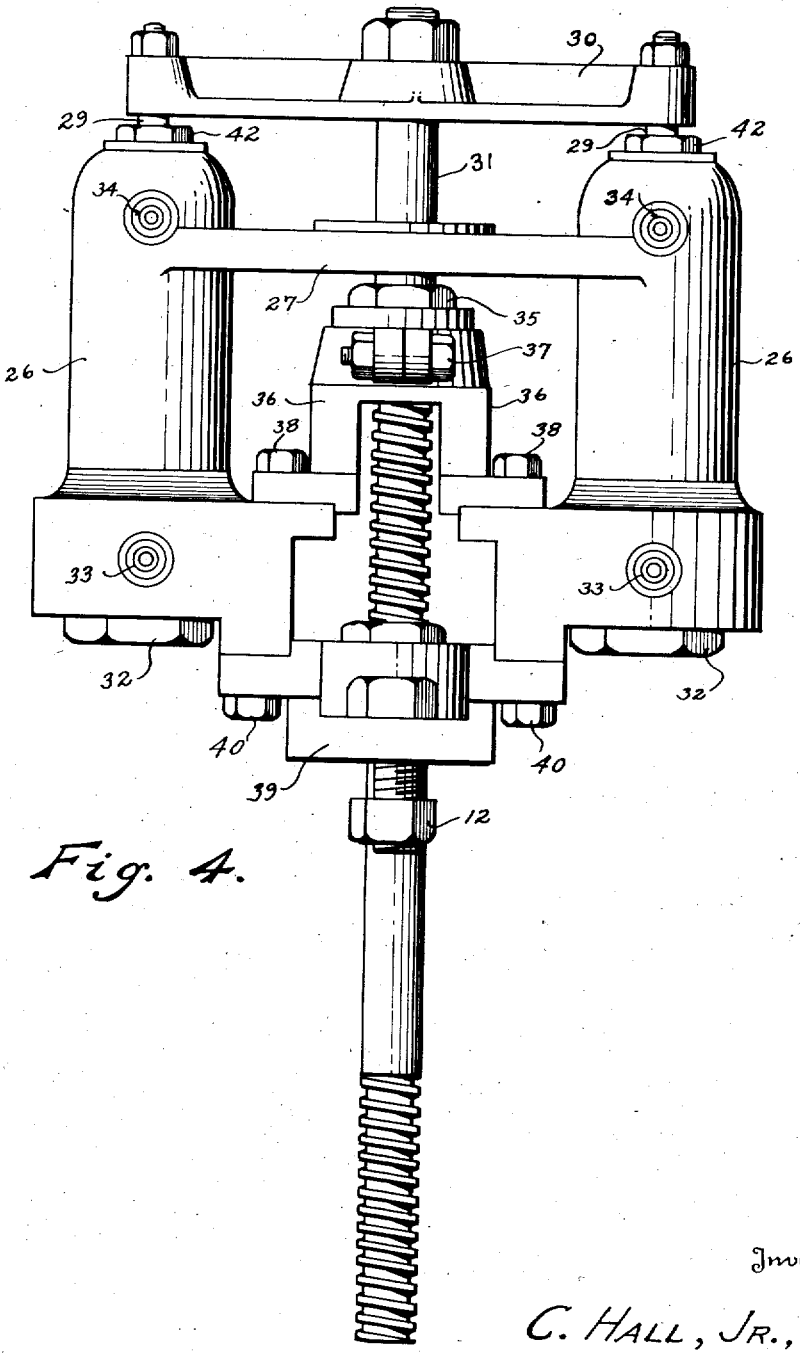
Figure 4 is a similar view of the same attachment but without the pipe connections and drain cocks, in order to better show details of the attachment.

As may be seen in Figure 4, the mouths of the cylinders are hermetically closed by means of the plugs 32 so that when pressure is applied through the apertures 33, the plungers will ascend and thereby open the gate of the valve. If pressure is applied through the apertures 34 then the plungers 28 will descend and thereby close the gate 2 of the valve.

Figure 3:
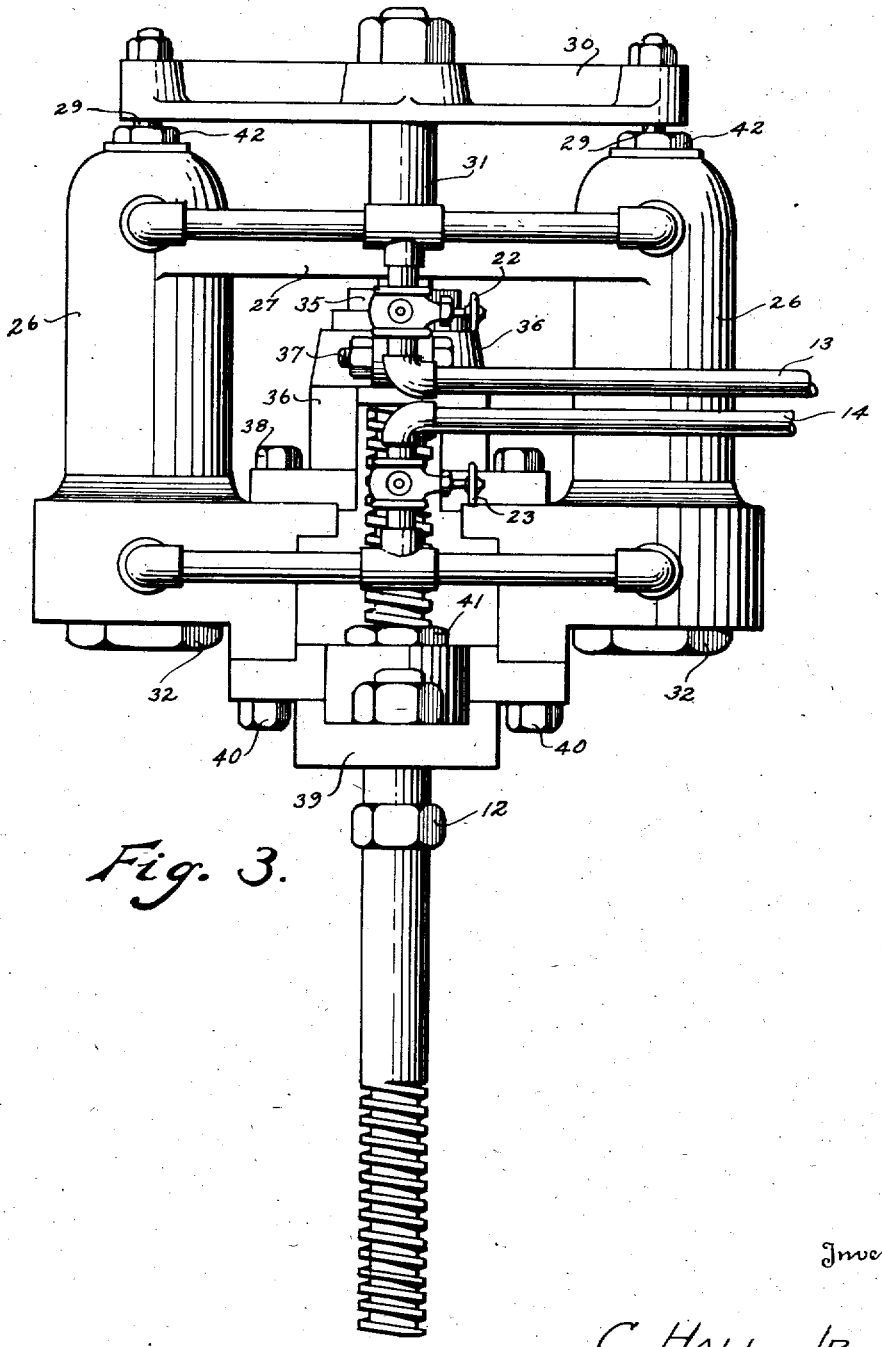
Figure 3 is a view in elevation of an attachment for "nonrising stem" valves.
Figure 5:
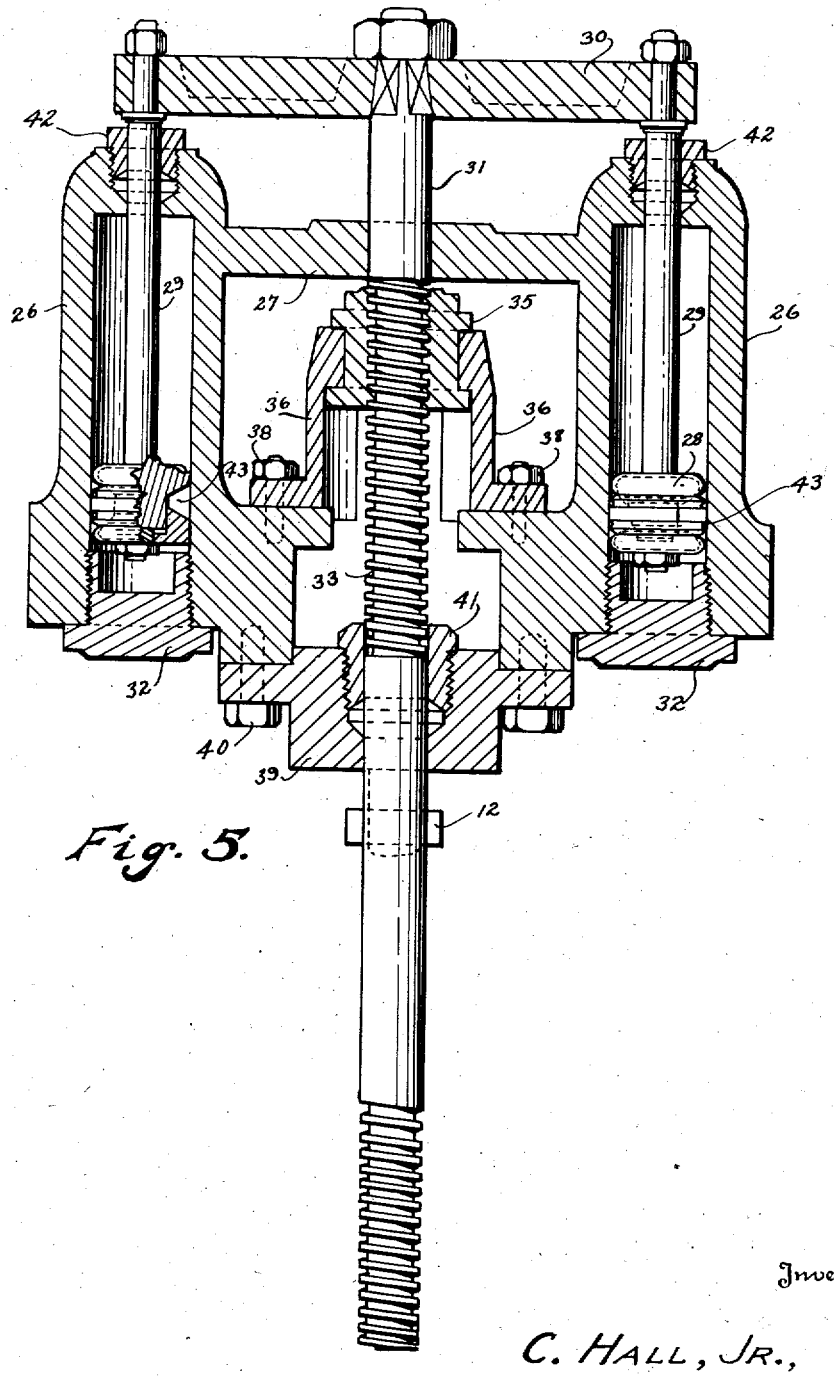
Figure 5 is a vertical cross section of the same attachment.

As may be seen in Figures 3, 4 and 5, the stem 31 is provided with thread on its interior part in order to connect with the gate of the valve. At about its middle portion the said stem is also provided with thread so that the valve may be opened and closed by hand by means of a sectioned nut 35 and the braces 36. These pieces 35 and 36 should be removed when the attachment is operated by fluid pressure, and this is done by removing the screws 37 and 38.

The attachment according to Figures 3, 4, 5 and 6 is connected to the base 39 by means of screws 40 and the base 39 is connected directly to the head 4 of the valve by means of screws 12. This base has not been made an integral part of the attachment with the object of being able to use an attachment on several kinds or types of valves of the same size, as in this case only the base would have to be made of different size. Both the stem 31 and the stems 29 are provided with stuffing boxes 41 and 42. The stems 28 are provided with metallic adjusting rings 43 so that in case of fire in a petroleum well during which the leather washers of the plungers are destroyed, the said plungers will still operate the attachment by fluid pressure for closing the valve.

Figures 7, 8 and 9 show the same attachment but constructed with only one cylinder. Otherwise this attachment is constructed with the same characteristics as the one just described, and can be applied to any kind of "nonrising stem" valve for the same purpose described.

The form shown in Figs. 7, 8 and 9 is very simple, as it can be connected directly to the upper part 4 of the valve by means of the screws 12.

In order to provide an ordinary "nonrising stem" valve with this attachment, it will be necessary to remove the hand wheel 8, the stuffing box 10, the screws and nuts 11, the stuffing box 5, the screws and nuts 12 of the stuffing box and the stem 1 whereafter the attachment is mounted on the part 4 of the valve (Fig. 7). The base 45 is thereafter secured to the part 4 by means of screws 12 connecting previously the thread 46 of the stem 47 of the attachment to the gate 2 of the valve.

The attachment consists of a cylinder 48 which is united with the base 45 by means of thread 49. The cylinder has a stem 47 with a plunger 50 which operates the stem 47 of the attachment by fluid pressure. When pressure is applied through pipe 13 the plunger will descend with the stem 47 which will close the gate 2 of the valve. If pressure is applied through pipe 14 then the plunger 50 will ascend together with the stem 47 and open the gate of the valve.

The cylinder 48 is hermetically closed in its lower extreme by the plug 51 and the stem 47 is properly packed in the base 45 by means of the stuffing box 52 and in the plug 51 of the cylinder by means of the stuffing box 53. The stem also has a packing in the upper part of the cylinder 48 by means of the stuffing box 54 and has attached in its upper part the hand wheel 55 which serves for opening and closing the valve by hand. This hand wheel will be the same as that found on the original valve.

In order to open or close the valve by hand with the wheel 55 fluid pressure is first applied through pipe 13 until the gate 2 of the valve remains in closed position, and thereafter the drain cocks 22 and 23 are closed. This done, the hand wheel 55, by turning in one direction or the other, will raise or lower the gate 2 on the thread 46 of the stem 47 of the attachment in order to respectively open or close the valve.

The operation of the attachment by fluid pressure is the same as that of the previously described attachment with two cylinders.

Having thus described the invention, what I claim is:

1. The combination of a gate valve of the type including a body, a gate and a bonnet, a fluid actuated piston detachably connected with the bonnet and including a stem, means for adjustably connecting the stem and the gate, a manually operable handle means associated with the stem, and means for admitting fluid under pressure above and below the piston for operating the gate from a fully closed to a fully opened position or from a fully closed to an intermediate position depending on the adjustable relation between the stem and gate.

2. The combination of a gate valve of the type having a body, a gate and a bonnet, a cylinder detachably connected with the bonnet, a piston within the cylinder including a stem, said stem extending into the body for adjustable connection with the gate of the valve and beyond the cylinder, manually operable means associated with the stem exteriorly of the cylinder, and means for admitting fluid under pressure to the upper and lower parts of the cylinder from a distant point for operating the gate from a fully closed to a fully opened position or from a fully closed to an intermediate position depending on the adjustable relation between the stem and gate.

3. A distant operating unitary attachment for converting standard gate valves of the non-rising stem type into long distance control valves, including a body, a gate and a bonnet, comprising a single cylinder having the outer end closed with the exception of an opening and the opposite end open, a stem arranged through and projecting beyond both ends of the cylinder, a piston on the stem inside of the cylinder, a supporting member at the inner end of the cylinder, and detachably connected to the bonnet of the valve, packing means in the cylinder, the lower end of the stem being threaded for detachable and adjustable engagement with the gate, means for admitting fluid pressure to the upper and lower parts of the said cylinder, and a hand wheel on the outer end of the stem for independent operation of the valve.

4. An attachment for operating from a distance by fluid pressure stemmed gate valves of the type having a body, a gate and a bonnet and comprising a base detachably connected to the bonnet of the valve, a single cylinder connected to the upper part of the base, a stem arranged through the cylinder and base and extending into the body and having a screw thread on its lower end for adjustably connecting the stem to the gate of the valve, a handle member secured to the upper extremity of the stem, a piston on said stem within said cylinder, and means for admitting fluid under pressure to the upper and lower parts of said cylinder from a distant point for operating the gate from a fully closed to a fully opened position or from a fully closed to an intermediate position depending on the adjustable relation between the stem and gate.

CARLOS HALL, JR.